United States Patent
Bolourchi et al.

(10) Patent No.: US 9,034,967 B2
(45) Date of Patent: May 19, 2015

(54) NON-HALOGENATED POLYOLEFIN COMPOUNDS HAVING GOOD PROCESSING PROPERTIES

(75) Inventors: Maziyar Bolourchi, Avon, OH (US); Roger W. Avakian, Solon, OH (US)

(73) Assignee: PolyOne Corporation, Avon Lake, OH (US)

(*) Notice: Subject to any disclaimer, the term of this patent is extended or adjusted under 35 U.S.C. 154(b) by 0 days.

(21) Appl. No.: 14/343,191

(22) PCT Filed: Sep. 6, 2012

(86) PCT No.: PCT/US2012/053867
§ 371 (c)(1),
(2), (4) Date: Mar. 6, 2014

(87) PCT Pub. No.: WO2013/036573
PCT Pub. Date: Mar. 14, 2013

(65) Prior Publication Data
US 2014/0213712 A1 Jul. 31, 2014

Related U.S. Application Data

(60) Provisional application No. 61/532,029, filed on Sep. 7, 2011.

(51) Int. Cl.
C08L 23/26 (2006.01)
C08L 51/06 (2006.01)
C08L 51/00 (2006.01)
C08F 255/02 (2006.01)

(52) U.S. Cl.
CPC ............. *C08L 51/003* (2013.01); *C08F 255/02* (2013.01); *C08L 51/06* (2013.01); *C08L 2201/02* (2013.01); *C08L 2205/025* (2013.01); *C08L 23/26* (2013.01)

(58) Field of Classification Search
CPC ................................. C08L 23/26; C08L 51/06
USPC .......................................... 524/437, 405, 707
See application file for complete search history.

(56) References Cited

U.S. PATENT DOCUMENTS

| 5,025,042 A | 6/1991 | Yoshida et al. |
| 6,414,084 B1 | 7/2002 | Adedeji |
| 2010/0319960 A1* | 12/2010 | Cree et al. ............... 174/110 SR |

FOREIGN PATENT DOCUMENTS

| WO | 2010-005147 | 1/2010 |
| WO | WO 2010005147 A2 * | 1/2010 |
| WO | 2010-024602 | 3/2010 |
| WO | WO 2010024602 A2 * | 3/2010 |

* cited by examiner

*Primary Examiner* — Michael M Bernshteyn
(74) *Attorney, Agent, or Firm* — John H. Hornickel; Maria M. Hoke

(57) ABSTRACT

A non-halogenated flame retardant thermoplastic compound is disclosed. The compound comprises one or more grafted polyolefin resins, non-halogenated flame retardant, non-halogenated processing aid, a compatibilizer, and, optionally, other additives. The non-halogenated processing aid found to be useful, among several candidates, was a dendritic polymer.

11 Claims, No Drawings

NON-HALOGENATED POLYOLEFIN COMPOUNDS HAVING GOOD PROCESSING PROPERTIES

CLAIM OF PRIORITY

This application claims priority from U.S. Provisional Patent Application Ser. No. 61/532,029 filed on Sep. 7, 2011, which is incorporated by reference.

FIELD OF THE INVENTION

This invention relates to non-halogenated polyolefin compounds having flame retardant properties.

BACKGROUND OF THE INVENTION

Highly grafted and highly filled thermoplastic compounds often suffer from processing difficulties in addition to unacceptable extrudate quality. Process aids can help during the extrusion processing without unduly affecting the performance properties of plastic articles made from the thermoplastic compounds.

Flame retardant thermoplastic compounds can be used in a number of products which be protected against fire. Flame retardant polyolefin compounds are common, with a desire in the marketplace to use non-halogenated flame retardants. Polyolefin resins in such non-halogenated flame retardant compounds can be improved by crosslinking in order to enhance thermal stability, cut through and chemical resistance.

Fluoropolymers can be used in small amounts as process aids for polyolefin compounds to enhance processability and extrudate quality. But fluoropolymer introduce halogenation to the compound and can not be used when the goal of the flame retardant thermoplastic compound is to be non-halogenated.

SUMMARY OF THE INVENTION

What the art needs is a non-halogenated processing aid for flame retardant thermoplastic compounds.

The present invention has found a non-halogenated chemical which surprisingly can be used as a processing aid for flame retardant thermoplastic compounds.

One aspect of the invention is a non-halogenated thermoplastic compound, comprising: (a) grafted polyolefin; (b) non-halogenated flame retardant; (c) dendrimer having CAS No. 326794-48-3; and (d) a maleic anhydride modified polyolefin of olefin same as or similar to the olefin of the grafted polyolefin.

Another aspect of the invention is a plastic article shaped from the thermoplastic compound described above.

EMBODIMENTS OF THE INVENTION

Grafted Polyolefin Resin

The formulation for a thermoplastic compound is chosen primarily based on the type of polymer resin(s) and desirable physical properties. Thermoplastic resins need both good processing into a final shape and good performance in that final shape.

Flame retardant thermoplastic compounds can use polyolefins even though when exposed to heat and flame, the polyolefin resins can melt and drip from their shape. Flame retardants minimize the melting and dripping.

Any conventional polyolefin can be used as the thermoplastic resin. Non-limiting examples of polyolefins include polyethylenes, ethylene copolymers, and combinations thereof.

Two different grades of polyolefin can be blended together to reduce viscosity and improve processability while maintaining other needed mechanical properties.

Physical properties of certain polyolefins can be improved if the polymer has more than a single backbone of monomeric units. Molecular weight of the polyolefin can be increased by grafting to that backbone.

The monomeric units of graft can be the same as or different from the monomeric units of the backbone. Preferably, the monomeric units of the graft and the backbone are the same polymer, though they may comprise different grades or molecular weights of that same polymer.

Of the available candidates, a polyethylene is preferred as the resin. Commercially available polyethylene resins include HD 6908.19 from ExxonMobil™; Sclair® 31E from Nova Chemicals; EM811 from Westlake Chemical, and Tafmer™ brand ethylene butylene copolymer resins from Mitsui.

Melt Flow Indices of polymer resins and or polymer resin blends can range from about 1 to about 75 and preferably from about 10 to about 40. Melt Flow Indices of grafted resins can range from about 1 to about 20 and preferably from about 5 to about 10.

Grafting requires both a free radical initiator and a polyfunctional organosilane. Any conventional initiator for polyolefins and any conventional organosilane are candidates for use in the invention. Particularly preferred are free radical initiators such as peroxides, and particularly, dicumyl peroxide. Particularly preferred organosilanes are vinyltrimethoxy silane and or vinyltriethoxy silane.

Grafting can occur in an extruder with the ingredients introduced at the head of the extruder operating at temperatures sufficient to melt the polymer resins and initiate the grafting reaction. Pellets of the grafted polyolefin resin can be formed for later compounding with the other ingredients of the compound.

Non-Halogenated Flame Retardant

Flame retardants which have no halogen atoms are now popular for use in thermoplastic compounds which are made into plastic articles used in interior and confined spaces. Fire in such spaces can generate noxious gases if the thermoplastic compound contains halogen atoms.

Polyolefin compounds of this invention can employ any conventional non-halogenated flame retardant. Non-limiting examples are aluminum trihydrate (ATH), magnesium dehydrate (MDH), hydrotalcite, zinc borate, phosphorus-nitrogen-containing-intumescent, and combinations thereof.

Non-Halogenated Processing Aid

Various non-halogenated processing aids were evaluated to determine their effect on processability and extrudate quality of the non-halogenated thermoplastic compound. While the addition of about 1-3 weight percent of such non-halogenated processing aids showed a reduction in viscosity, a sign of improved processing, the extrudate quality for these processing aids was consistently poor due to surface roughness of the extrudate, except one.

As seen in the Examples below, unexpectedly, a dendritic polymer provided both an improvement in viscosity and a smooth extrudate surface.

The dendritic polymer found to be an excellent processing aid is Boltorn® H20 polymer commercially available from Perstorp. The dendritic polymer has CAS Registry No. 326794-48-3 from the Chemical Abstracts Service and a highly branched polyester structure with theoretically 16 primary hydroxyl groups. Boltorn® H20 is an amorphous solid at room temperature and is available in pellet form.

The dendritic polymer has a weight average molecular weight of about 2100 g/mole; a polydispersity (Mw/Mn) of about 1.3; a viscosity at 110° C. and 30 $\text{secs}^{-1}$ of about 7 Pascals; and a glass transition temperature (Tg) of 30° C. The Boltorn® H20 dendritic polymer is marketed to promote dense branching of a polymer backbone without crosslinking, which is highly appreciated in many applications, including use in this invention. The dendritic structure offers unique possibilities by combining excellent reactivity with low viscosity and enhanced mechanical properties.

Compatibilizer

The compound can benefit from the use of a compatibilizer in order to couple with ATH and or MDH to enhance properties. Of suitable candidates, Tafmer™ MA8510, maleic anhydride-modified ethylene-butene copolymer, by Mitsui is preferred because the copolymer moiety is the same as the preferred ethylene-butene copolymer and the maleic anhydride polar grafts associate with the ATH or MDH. If the polyolefin is polyethylene or polypropylene, maleic anhydride grafted versions can be used as compatibilizers.

Optional Additives

The compound of the present invention can include conventional plastics additives in an amount that is sufficient to obtain a desired processing or performance property for the compound. The amount should not be wasteful of the additive nor detrimental to the processing or performance of the compound. Those skilled in the art of thermoplastics compounding, without undue experimentation but with reference to such treatises as *Plastics Additives Database* (2004) from Plastics Design Library (www.williamandrew.com), can select from many different types of additives for inclusion into the compounds of the present invention.

Non-limiting examples of optional additives include adhesion promoters; biocides (antibacterials, fungicides, and mildewcides), anti-fogging agents; anti-static agents; bonding, blowing and foaming agents; compatibilizers; dispersants; fillers and extenders; smoke suppressants; impact modifiers; initiators; lubricants; micas; pigments, colorants and dyes; plasticizers; release agents; silanes, titanates and zirconates; slip and anti-blocking agents; stabilizers; stearates; ultraviolet light absorbers; viscosity regulators; waxes; and combinations of them.

Table 1 shows acceptable, desirable, and preferred ranges of the ingredients of the compound. The compound can comprise, consist essentially of, or consist of these ingredients.

TABLE 1

| Ingredient (Wt. %) | Acceptable | Desirable | Preferred |
| --- | --- | --- | --- |
| Grafted Resin | 10-40 | 15-30 | 20-25 |
| Non-Halogenated Flame Retardant | 50-80 | 60-75 | 65-70 |
| Non-Halogenated Processing Aid | 0.5-5 | 1-4 | 1-3 |
| Compatibilizer | 1-10 | 2-9 | 3-8 |
| Other Additives | 0-10 | 0-5 | 0.1-5 |

Processing

Grafting

In this invention, a grafting reaction can occur as a means to tailor properties of the polyolefin resin before melt mixing with other ingredients and without subjecting that polyolefin to an irreversible crosslinking and formation of a thermoset plastic before all ingredients are properly dispersed.

In one embodiment, an extruder is used as the site of reactive extrusion (REX) by which free radical initiation is followed by hydrogen abstraction from the polymer which is followed by grafting of a functional organosilane to the polymer at the site of hydrogen abstraction.

The initiator is typically a peroxide, typically dicumyl peroxide to form free radical, a functional organosilane for grafting, typically vinyltrimethoxy silane (VTMS) and polyolefin, such as polyethylene homopolymer or copolymer, as the matrix. Proper ratios of each ingredients are introduced into extruder (using a single or twin screw configuration) and processed. Table 2 shows acceptable, desirable, and preferred ranges of the ingredients for the grafting of the polyolefin resin. The compound can comprise, consist essentially of, or consist of these ingredients.

TABLE 2

| Ingredient (Wt. %) | Acceptable | Desirable | Preferred |
| --- | --- | --- | --- |
| Ungrafted Resin | 97.90-98.50 | 98.05-98.25 | 98.15 |
| Peroxide Initiator | 0.35-0.60 | 0.45-0.55 | 0.50 |
| Silane | 1.20-1.50 | 1.30-1.40 | 1.35 |

Parameters including process temperature, screw rpm, screw design, feed locations, humidity and proper conditioning of silane and peroxide all play an integral role in producing the grafted resin.

Grafting of the polyolefin resin can occur under the following extrusion conditions of temperature: 190° C. and residence time: 45-60 seconds.

The grafting step just described is followed by melt mixing which can be in batch or continuous operations.

Mixing in a continuous process typically occurs in an extruder that is elevated to a temperature that is sufficient to melt the polymer matrix with addition either at the head of the extruder or downstream in the extruder of the solid ingredient additives. Extruder speeds can range from about 50 to about 500 revolutions per minute (rpm), and preferably from about 100 to about 300 rpm. Typically, the output from the extruder is pelletized for later extrusion or molding into polymeric articles.

Mixing in a batch process typically occurs in a Banbury mixer that is also elevated to a temperature that is sufficient to melt the polymer matrix to permit addition of the solid ingredient additives. The mixing speeds range from 60 to 1000 rpm. Also, the output from the mixer is chopped into smaller sizes for later extrusion or molding into polymeric articles.

The grafted polyolefin resin faces a difficult melt mixing, in that (a) the amount of loading of non-halogenated flame retardant can comprise about two/thirds of the total weight of the compound and (b) the non-halogenated flame retardant, such as ATH, degrades near the melting temperatures needed for proper melt mixing into the grafted polyolefin resin.

A compatibilizer is needed during this step to help associate the ATH with the continuous phase of grafted polyolefin resin. Stabilizer and processing aids are optionally added during this second step for improved processing and performance properties. Processing conditions should take into consideration the highly filled nature of this compound.

One irony of this second step is that the byproduct of degraded ATH is water, which is a component which can initiate a crosslinking event in the presence of grafted resin. Crosslinking during the melt mixing would be a failure of the processing.

Subsequent extrusion or molding techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (www.williamandrew.com), one can make articles of any conceivable shape and appearance using compounds of the present invention.

More specifically, it is contemplated that the manufacturer of the final plastic article will employ molding or extruding in the presence of a crosslinking agent to form a partially or fully crosslinked plastic article. In one embodiment, a "two part" system or kit is sold to the customer. One part (Part A) contains the compound described above, namely: the grafted polyolefin resin, the non-halogenated flame retardant, the compatibilizer, optionally a stabilizer, and optionally a process aid. The second part (Part B) contains ungrafted polyolefin resin, stabilizer, and a catalyst. Often, this second part is a masterbatch in which the proportions of stabilizer and catalyst in the polyolefin resin serving as a carrier are established to be stoichometrically suitable for reaction with the compound described above.

Table 3 shows acceptable, desirable, and preferred ranges of the ingredients to make the curing masterbatch. The compound can comprise, consist essentially of, or consist of these ingredients.

TABLE 3

| Ingredient (Wt. %) | Acceptable | Desirable | Preferred |
| --- | --- | --- | --- |
| Ungrafted Resin | 99.80-99.25 | 99.52-99.38 | 99.43 |
| Stabilizer | 0.25-0.50 | 0.30-0.40 | 0.38 |
| Tin-based Catalyst | 0.15-0.25 | 0.18-0.22 | 0.19 |

An Irganox 1010 stabilizer is typically employed to stabilize ungrafted polymer matrix. A dibutyl tin dilaurate catalyst is typically employed to catalyze the reaction of the silane grafts on the grafted polyolefin resin with and among other silane grafts in the presence of moisture.

In other words, as known to persons having ordinary skill in the art, moisture curing or crosslinking of a silane-functional polymer begins with hydrolysis of the silane esters, such as three silane esters hydrolyzing into three alcohols and releasing methanol as byproduct in an environment where moisture (water) is available. The silanols so formed can then condense and form siloxane bridges with neighboring silanols on different grafts in the presence of the tin catalyst.

The ratio of the two parts of the system can range from about 97:3 to about 93:7 and preferably from about 96:4 to about 94:6 of compound:masterbatch (Part A:Part B).

Moisture curing of the compound of Part A with the catalyst containing masterbatch Part B can occur at about 85-90° C., about 95% humidity, for about 6 hours in a reaction vessel or in a mold or in final article placement. As an example of the third possibility, the compound of this invention can be moisture-cured as a part of formation of insulation or jacketing for a wire or cable used for electrical, optical, or other communications transmission. The presence of moisture in that insulating or jacketing step permits the compound of Part A and the masterbatch of Part B to react and cure the compound with silane crosslinks.

The extent of crosslinking can be managed by adjustment of the ratios of ingredients and by adjustment of the reaction conditions, and it is desirable for the extent of crosslinking to range from about 60 to about 90 and preferably from about 70 to about 80%.

USEFULNESS OF THE INVENTION

Thermoplastic compounds can be shaped by extrusion, molding, calendering, or thermoforming into any plastic article usable in an interior or confined space where fire can cause personal injury or property damage. The compounds resist melting and dripping and can minimize smoke and fumes.

Wire and cable insulation or jacketing is a particularly preferred use of these thermoplastic compounds.

EXAMPLES

Examples 1-3 and Comparative Examples A-V

Table 4 shows the ingredients used to prepare the Examples and Comparative Examples. Table 5 shows the formulation of the grafted resin. Tables 6, 7, and 8 show the formulations of the flame retardant compound, processing conditions and test results.

TABLE 4

| Ingredient | Chemistry | Source | Purpose |
| --- | --- | --- | --- |
| Tafmer DF 8200 | Ethylene butene copolymer | Mitsui | Resin |
| Tafmer DF 840 | Ethylene butene copolymer | Mitsui | Resin |
| Dicumyl Peroxide | Dicumyl Peroxide | Akzo Nobel | Free Radical Initiator |
| Silquest A-171 | Vinyltrimethoxy Silane | Akzo Nobel | Grafting Aid |
| Apyral 40CD (ATH) | Aluminum Trihydrate | Nabaltec | Flame Retardant |
| Tafmer MA8510 | Maleic Anhydride-modified ethylene-butene copolymer | Mitsui | Compatibilizer |
| EX-1462 | Proprietary | Chemtura | Process Aid |
| Erucamide | Erucamide | PMC | Process Aid |
| Kemamide EZ Bead | Erucamide | PMC | Process Aid |
| Kemamide E-180 | Stearyl Erucamide | PMC | Process Aid |
| Kemamide W 40 Prill | N,N'-ethylenebisstearamide | PMC | Process Aid |
| Boltron H20 | Highly branched polyester dendrimer | Perstrop | Process Aid |
| Cyphos 104 | Phosphonium salt | Cytec | Process Aid |
| Irganox B225 | Blend of Phenolic & Organophosphite | Ciba | Stabilizer |
| DSTDP | Thioester | Chemtura | Stabilizer |
| Unilin 700 | Long Chain Primary Alcohols | Baker Hughes | Process Aid |
| Polywax 725 Baker Hughes | Polyethylene wax | Baker Hughes | Process Aid |
| Polywax 2000 Baker Hughes | Polyethylene wax | Baker Hughes | Process Aid |
| Plastaid | Fatty Acid Mixture Derivative | Akash | Process Aid |
| Akawax C | Ethylenebisstearamide | Akash | Process Aid |

TABLE 5

| Grafted Resin (Wt. %) | |
| --- | --- |
| Tafmer DF 8200 | 73.62 |
| Tafmer DF 840 | 24.53 |
| Dicumyl Peroxide | 0.50 |
| Silquest A-171 | 1.35 |
| Total | 100.00 |

A 16 mm Prism counter-rotating twin screw extruder having a L:D ratio of 40:1 was used to make the grafted resin shown in Table 5. Temperature was 190° C. in all zones and die. The RPM was 175; the die pressure was 33 bar; the feeder rate was 12%; the vacuum was 19 inches Hg; and the percent torque ranged from 72-80%. The grafted resin was pelletized for later compounding. The grafted resin along with FR additive, stabilizers, compatibilizer and various processing aids was then introduced into 16 mm Prism twin screw extruder to make a highly filled grafted composite as listed on Tables 6 through 8.

TABLE 6

| Example (Wt. %) | A | B | C | D | E | F | G | H |
|---|---|---|---|---|---|---|---|---|
| Grafted Resin from Table 5 (VTMS 1.35% DCP 0.5%) | 29.70 | 26.20 | 25.20 | 23.20 | 25.20 | 23.20 | 25.20 | 23.20 |
| Apyral 40CD (ATH) | 65.00 | 68.50 | 68.50 | 68.50 | 68.50 | 68.50 | 68.50 | 68.50 |
| Tafmer MA8510 | 5.00 | 5.00 | 5.00 | 5.00 | 5.00 | 5.00 | 5.00 | 5.00 |
| EX-1462 | | | 1.00 | 3.00 | | | | |
| Erucamide | | | | | 1.00 | 3.00 | | |
| Kemamide EZ Bead | | | | | | | 1.00 | 3.00 |
| Kemamide E-180 | | | | | | | | |
| Kemamide W 40 Prill | | | | | | | | |
| Boltron H20 dendrimer | | | | | | | | |
| Cyphos 104 | | | | | | | | |
| Irganox B225 | 0.15 | 0.15 | 0.15 | 0.15 | 0.15 | 0.15 | 0.15 | 0.15 |
| DSTDP | 0.15 | 0.15 | 0.15 | 0.15 | 0.15 | 0.15 | 0.15 | 0.15 |
| TOTAL | 100.00 | 100.00 | 100.00 | 100.00 | 100.00 | 100.00 | 100.00 | 100.00 |
| Processing Conditions | | | | | | | | |
| Temperature in Zones 1-8 (° C.) | 180 | 180 | 180 | 180 | 180 | 180 | 180 | 180 |
| Temperature in Zone 9 and Die (° C.) | 175 | 175 | 175 | 175 | 175 | 175 | 175 | 175 |
| RPM | 150 | 150 | 150 | 150 | 150 | 150 | 150 | 150 |
| % Torque | 58-65 | 67-75 | 67-71 | 60-69 | 67-70 | 56-60 | 80-83 | 79-82 |
| Die Pressure (Bar) | 40 | 59 | 49 | 50 | 49 | 54 | 55 | 52 |
| Feeder Rate (%) | 20 | 20 | 20 | 20 | 20 | 20 | 20 | 20 |
| Vacuum (Inches) | 20 | 19 | 19 | 20 | 20 | 19 | 19 | 20 |
| Processability (16 mm Prism TSE) | OK | OK | OK | OK | OK | OK | OK | OK |
| Test Results | | | | | | | | |
| Rheology extrudate | Rough | Rough | Rough | Rough | Rough | Rough | Rough | Rough |
| TGA of strands (% ATH) | 62.3 | 64.1 | 62.9 | 67.1 | 65.5 | 65.8 | 62.7 | 64.1 |
| LOI (%) | 35.6 | 41.8 | 41.3 | 39.9 | 40.9 | 46.1 | 40.6 | 40.6 |
| Capillary, % Viscosity Change at 10 s$^{-1}$ Compared to Comp. Example A | −14 | 0 | −23 | −19 | −18 | −10 | −8 | −16 |
| Capillary, % Viscosity Change at 100 s$^{-1}$ Compared to Comp. Example A | −11 | 0 | −22 | −37 | −31 | −13 | −11 | −9 |
| Capillary, % Viscosity Change at 1000 s$^{-1}$ Compared to Comp. Example A | −8 | 0 | −11 | −33 | −20 | −6 | −4 | −5 |

TABLE 7

| Example (Wt. %) | I | J | K | L | 1 | 2 | M | N |
|---|---|---|---|---|---|---|---|---|
| Grafted Resin from Table 5 (VTMS 1.35% DCP 0.5%) | 25.20 | 23.20 | 25.20 | 23.20 | 25.20 | 23.20 | 26.10 | 25.70 |
| Apyral 40CD (ATH) | 68.50 | 68.50 | 68.50 | 68.50 | 68.50 | 68.50 | 68.50 | 68.50 |
| Tafmer MA8510 | 5.00 | 5.00 | 5.00 | 5.00 | 5.00 | 5.00 | 5.00 | 5.00 |
| EX-1462 | | | | | | | | |
| Erucamide | | | | | | | | |
| Kemamide EZ Bead | | | | | | | | |
| Kemamide E-180 | 1.00 | 3.00 | | | | | | |
| Kemamide W 40 Prill | | | 1.00 | 3.00 | | | | |
| Boltron H20 dendrimer | | | | | 1.00 | 3.00 | | |
| Cyphos 104 (Phosphonium Salt) | | | | | | | 0.10 | 0.50 |
| Irganox B225 | 0.15 | 0.15 | 0.15 | 0.15 | 0.15 | 0.15 | 0.15 | 0.15 |
| DSTDP | 0.15 | 0.15 | 0.15 | 0.15 | 0.15 | 0.15 | 0.15 | 0.15 |
| TOTAL | 100.00 | 100.00 | 100.00 | 100.00 | 100.00 | 100.00 | 100.00 | 100.00 |
| Processing Conditions | | | | | | | | |
| Temperature in Zones 1-8 (° C.) | 180 | 180 | 180 | 180 | 180 | 180 | 180 | 180 |
| Temperature in Zone 9 and Die (° C.) | 175 | 175 | 175 | 175 | 175 | 175 | 175 | 175 |
| RPM | 150 | 150 | 150 | 150 | 150 | 150 | 150 | 150 |
| % Torque | 51-54 | 46-51 | 88-100 | 64-67 | 55-60 | 55-59 | 62-70 | 79-81 |
| Die Pressure (Bar) | 45 | 45 | 66 | 50 | 41 | 49 | 58 | 74 |
| Feeder Rate (%) | 20 | 20 | 17 | 20 | 20 | 20 | 20 | 20 |
| Vacuum (Inches) | 19 | 20 | 14 | 19 | 19 | 19 | 20 | 20 |
| Processability (16 mm Prism TSE) | BAD | BAD | OK | OK | BEST | BEST | GOOD | BAD |
| Rheology extrudate | Rough | Rough | Rough | Rough | Smooth | Smooth | Rough | Rough |
| TGA of strands (% ATH) | 68.2 | 67.1 | 65.8 | 68.0 | 67.6 | 65.3 | 61.7 | 66.1 |
| LOI (%) | 38.9 | 45.4 | 40.7 | 40.4 | 38.8 | 39.5 | 34.6 | 36.9 |
| Capillary, % Viscosity Change at 10 s$^{-1}$ Compared to Comp. Example A | 2 | −17 | −9 | −33 | −29 | −40 | −7 | 43 |

TABLE 7-continued

| Example (Wt. %) | I | J | K | L | 1 | 2 | M | N |
|---|---|---|---|---|---|---|---|---|
| Capillary, % Viscosity Change at 100 s$^{-1}$ Compared to Comp. Example A | 0 | −15 | −8 | −27 | −17 | −48 | −2 | 31 |
| Capillary, % Viscosity Change at 1000 s$^{-1}$ Compared to Comp. Example A | 3 | −12 | −5 | −20 | −12 | −21 | −5 | 28 |

TABLE 8

| Example (Wt. %) | O | P | Q | R | S | T | 3 | U | V |
|---|---|---|---|---|---|---|---|---|---|
| Grafted Resin from Table 5 (VTMS 1.35% DCP 0.5%) | 26.20 | 24.70 | 24.70 | 24.70 | 24.70 | 24.70 | 24.70 | 24.70 | 24.70 |
| Apyral 40CD (ATH) | 68.50 | 68.50 | 68.50 | 68.50 | 68.50 | 68.50 | 68.50 | 68.50 | 68.50 |
| Tafmer MA8510 | 5.00 | 5.00 | 5.00 | 5.00 | 5.00 | 5.00 | 5.00 | 5.00 | 5.00 |
| EX-1462 | | 1.50 | | | | | | | |
| Eurcamid from SEM L04000154BSP | | | 1.50 | | | | | | |
| Unilin 700 | | | | 1.50 | | | | | |
| Polywax 725 Baker Hughes | | | | | 1.50 | | | | |
| Polywax 2000 Baker Hughes | | | | | | 1.50 | | | |
| Boltron H20 dendrimer | | | | | | | 1.50 | | |
| Plastaid | | | | | | | | 1.50 | |
| Akawax C | | | | | | | | | 1.50 |
| Irganox B225 | 0.15 | 0.15 | 0.15 | 0.15 | 0.15 | 0.15 | 0.15 | 0.15 | 0.15 |
| DSTDP | 0.15 | 0.15 | 0.15 | 0.15 | 0.15 | 0.15 | 0.15 | 0.15 | 0.15 |
| TOTAL(%) | 100.00 | 100.00 | 100.00 | 100.00 | 100.00 | 100.00 | 100.00 | 100.00 | 100.00 |
| Processing Conditions | | | | | | | | | |
| Temperature in Zones 1-8 (° C.) | 175-180 | 175-180 | 175-180 | 175-180 | 175-180 | 175-180 | 175-180 | 175-180 | 175-180 |
| Temperature in Zone 9 and Die (° C.) | 175 | 175 | 175 | 175 | 175 | 175 | 175 | 175 | 175 |
| RPM | 150 | 150 | 150 | 150 | 150 | 150 | 150 | 150 | 150 |
| % Torque | 58-62 | 60-62 | 65-68 | 62-64 | 57-63 | 61-65 | 57-62 | 58-64 | 61-72 |
| Die Pressure (Bar) | 60 | 50 | 48 | 51 | 49 | 52 | 50 | 52 | 58 |
| Feeder Rate (%) | 15 | 20 | 20 | 20 | 20 | 20 | 20 | 20 | 20 |
| Vacuum (Inches) | 19 | 20 | 19 | 20 | 20 | 20 | 20 | 20 | 19 |
| Processability (16 mm Prism TSE) | OK | OK | OK | OK | OK | OK | BEST | BAD | OK |
| Rheology extrudate | Rough | Rough | Rough | Rough | Rough | Rough | Smooth | N/A | Rough |
| TGA (% ATH) | 64 | 63 | 65 | 63 | 64 | 64 | 66 | N/A | 65 |
| Limited Oxygen Index LOI (%) | 43 | 34.6 | 40.1 | 37.8 | 34.3 | 56.4 | 57.5 | N/A | 50.8 |
| Capillary, % Viscosity Change at 10 s$^{-1}$ Compared to Comp. Example O | 0% | −13% | −1% | −13% | −24% | −20% | −21% | N/A | −5% |
| Capillary, % Viscosity Change at 100 s$^{-1}$ Compared to Comp. Example O | 0% | −23% | 1% | −12% | −22% | −19% | −16% | N/A | −8% |
| Capillary, % Viscosity Change at 1000 s$^{-1}$ Compared to Comp. Example O | 0% | −19% | 7% | −10% | −16% | −14% | −11% | N/A | −4% |

After the grafted resin was made, Comparative Examples A and B were prepared as the controls, because neither had any processing aid present. Comparative Examples C-N attempting to prepare acceptable capillary extrudate. Examples 1 and 2 were the only successful experiments, which demonstrated the unexpected performance of dendritic polymer to serve as a non-halogenated processing aid.

Comparative Example O restarted the experiments as the control. Comparative Examples P-V were unsuccessful, but Example 3 with dendritic polymer was.

Without being limited to a particular theory, it is believed that the highly branched structure, with 16 hydroxyl groups, of the dendritic polymer provides sufficient polarity, enough so that the polymer macromolecules would migrate to the surface of the compound during melt mixing and during final shaping processes, thereby providing aid to those processing events.

Though the dendritic polymer has 16 hydroxyl groups, no substantial reaction with other ingredients was identified. If there had been noticeable reaction, the torque level on the extruder would have increased.

The invention is not limited to the above embodiments. The claims follow.

What is claimed is:

1. A non-halogenated thermoplastic composition, comprising:
   (a) grafted polyolefin;
   (b) non-halogenated flame retardant;
   (c) dendrimer having CAS Registry No. 326794-48-3; and
   (d) a maleic anhydride modified polyolefin.

2. The composition of claim 1, wherein the grafted polyolefin is the reaction product of a polyolefin resin and a polyfunctional organosilane in the presence of an initiator.

3. The composition of claim 2, wherein the polyolefin is a polyethylene homopolymer or copolymer and wherein the polyfunctional organosilane is vinyltrimethoxy silane or vinyltriethoxy silane.

4. The composition of claim 3, wherein the non-halogenated flame retardant is selected from the group consisting of aluminum trihydrate, magnesium dehydrate, hydrotalcite, zinc borate, a phosphorus-nitrogen-containing-intumescent, and combinations thereof.

5. The composition of claim 1, wherein the non-halogenated flame retardant is selected from the group consisting of aluminum trihydrate, magnesium dehydrate, hydrotalcite, zinc borate, a phosphorus-nitrogen-containing-intumescent, and combinations thereof.

6. The composition of claim 4, wherein the dendrimer has a weight average molecular weight of about 2100 g/mole; a polydispersity (Mw/Mn) of about 1.3; a viscosity at 110° C. and 30 secs−1 of about 7 Pascals; and a glass transition temperature (Tg) of 30° C.

7. The composition of claim 1, wherein the dendrimer has a weight average molecular weight of about 2100 g/mole; a polydispersity (Mw/Mn) of about 1.3; a viscosity at 110° C. and 30 secs−1 of about 7 Pascals; and a glass transition temperature (Tg) of 30° C.

8. The composition of claim 6, wherein the grafted polyolefin is an the grafted poly(ethylene-co-butene) and maleic anhydride modified polyolefin is maleic anhydride-modified poly(ethylene-co-butene).

9. The composition of claim 1, wherein the grafted polyolefin is the grafted poly(ethylene-co-butene) and maleic anhydride modified polyolefin is maleic anhydride-modified poly(ethylene-co-butene).

10. A plastic article shaped from the compound of claim 1.

11. The article of claim 10, wherein the article is jacketing or insulation for wire or cable.

* * * * *